(12) United States Patent
Heitz

(10) Patent No.: US 11,958,565 B2
(45) Date of Patent: Apr. 16, 2024

(54) CRANK ASSEMBLY FOR A BICYCLE

(71) Applicant: Lance A Heitz, Presque Isle, MI (US)

(72) Inventor: Lance A Heitz, Presque Isle, MI (US)

(*) Notice: Subject to any disclaimer, the term of this patent is extended or adjusted under 35 U.S.C. 154(b) by 0 days.

(21) Appl. No.: 17/857,005

(22) Filed: Jul. 3, 2022

(65) Prior Publication Data

US 2024/0002012 A1  Jan. 4, 2024

(51) Int. Cl.
*B62M 1/36* (2013.01)
*B62M 9/08* (2006.01)

(52) U.S. Cl.
CPC ............... *B62M 1/36* (2013.01); *B62M 9/08* (2013.01)

(58) Field of Classification Search
CPC .................................. B62M 1/36; B62M 9/08
See application file for complete search history.

(56) References Cited

U.S. PATENT DOCUMENTS

| | | | | |
|---|---|---|---|---|
| 528,145 A | * | 10/1894 | Carr | ........................... F16H 7/06 474/84 |
| 2,693,119 A | * | 11/1954 | Payberg | .................. B62M 3/06 74/594.2 |
| 3,259,398 A | * | 7/1966 | Hattan | ..................... B62M 9/08 474/82 |
| 3,375,022 A | * | 3/1968 | Hattan | ..................... B62M 9/08 474/151 |
| 8,328,216 B2 | | 1/2012 | Lee | |
| 10,850,800 B2 | | 12/2020 | Schmertz et al. | |
| 11,046,387 B2 | | 6/2021 | Kang | |
| 2021/0163095 A1 | | 6/2021 | Schmidt | |

FOREIGN PATENT DOCUMENTS

WO       WO2013187641 A1      12/2013

* cited by examiner

*Primary Examiner* — Kevin Hurley
(74) *Attorney, Agent, or Firm* — Weiner & Burt PC; Irving M. Weiner; Pamela S. Burt

(57) ABSTRACT

A crank assembly for a bicycle includes a crank axle rotatably mounted to a frame of the bicycle, and a carrier shaft slidably mounted on the crank axle and configured to slide in a direction substantially parallel to a central longitudinal axis of the crank axle and relative to the crank axle. The crank assembly also includes an elliptical sprocket mounted on the carrier shaft. The elliptical sprocket rotates to move the bicycle in response to a rotation of the crank axle. A start time of a power stroke of the elliptical sprocket is changed by sliding the carrier shaft relative to the crank axle.

20 Claims, 4 Drawing Sheets

CRANK ASSEMBLY FOR A BICYCLE

TECHNICAL FIELD

The present disclosure relates, generally, to a crank assembly for a bicycle and more particularly relates to a crank assembly for a bicycle having an elliptical sprocket and enables a change in a start time of a power stroke of the bicycle.

BACKGROUND

Conventional bicycles include a normally tubular frame with a front wheel capable of being steered by a handlebar, as well as a rear wheel. The rear wheel is driven by a chain that extends around a sprocket driven by pedals mounted on cranks. The sprocket is a generally a circular sprocket having a pedal stroke that begins when the crank is at a vertical upward position, providing a less than optimal power transfer to the bicycle. To overcome this, use of over or elliptical sprocket is increasing. However, the oval or elliptical sprocket also has less than optimal power stroke when the bicycle is moving on an inclined terrain. Therefore, there is a need for a mechanism that maintain optimal power stroke of the bicycle even during movement over the inclined terrain.

SUMMARY

In accordance with one embodiment, a crank assembly for a bicycle is provided. The crank assembly includes a crank axle rotatably mounted to a frame of the bicycle, and a carrier shaft slidably mounted on the crank axle and configured to slide in a direction substantially parallel to a central longitudinal axis of the crank axle and relative to the crank axle. The crank assembly also includes an elliptical sprocket mounted on the carrier shaft. The elliptical sprocket rotates to move the bicycle in response to a rotation of the crank axle. A start time of a power stroke of the elliptical sprocket is changed by sliding the carrier shaft relative to the crank axle.

In some embodiments, the carrier shaft includes a curved slot defined along an inner surface of the carrier shaft. The carrier shaft rotates about the central longitudinal axis in response to the sliding of the carrier shaft relative to the crank axle to facilitate in changing the start time of the power stroke of the elliptical sprocket.

In some embodiments, the carrier shaft includes external splines adapted to engage with the sprocket to couple the sprocket with the carrier shaft.

In some embodiments, the crank assembly further includes a lever engaged to the carrier shaft and adapted to be manipulated to enable the sliding of the carrier shaft relative to the crank axle.

According to an embodiment, the crank assembly further includes a crank arm fixedly attached to the crank axle to facilitate the rotation of the crank axle about the central longitudinal axis of the crank axle.

In some embodiments, an angular orientation of a major axis of the elliptical sprocket relative to a longitudinal axis of the crank arm is changed in response to the sliding to the carrier shaft relative to the crank axle.

In some embodiments, the crank assembly further includes an inclination sensor to determine an inclination of a terrain of travel of the bicycle, and a controller is configured to cause the movement of the lever to slide the carrier shaft relative to the crank axle based on an input from the inclination sensor to change the start time of the power stroke of the elliptical sprocket.

According to an embodiment, the controller changes the start time of the power stroke of the elliptical sprocket based on a direction of the travel of the bicycle.

In some embodiments, the crank assembly further includes a keeper post to prevent a movement of the sprocket in a direction substantially parallel to the central longitudinal axis In accordance with another example embodiment, a bicycle is disclosed. The bicycle includes a frame, a front wheel and a rear wheel supported on the frame. The bicycle also includes a crank axle rotatably mounted to the frame, and a carrier shaft slidably mounted on the crank axle and configured to slide in a direction substantially parallel to a central longitudinal axis of the crank axle and relative to the crank axle. The bicycle also includes an elliptical sprocket mounted on the carrier shaft. The elliptical sprocket rotates to rotate the rear wheel in response to the rotation of the crank axle. A start time of a power stroke of the elliptical sprocket is changed by sliding the carrier shaft relative to the crank axle.

In some embodiments, the carrier shaft includes a curved slot defined along an inner surface of the carrier shaft. The carrier shaft rotates about the central longitudinal axis in response to the sliding of the carrier shaft relative to the crank axle to facilitate in changing the start time of the power stroke of the elliptical sprocket.

In some embodiments, the carrier shaft includes external splines adapted to engage with the sprocket to securely mount the sprocket on the carrier shaft.

In some embodiments, the bicycle further includes a lever engaged to the carrier shaft and adapted to be manipulated to enable the sliding of the carrier shaft relative to the crank axle.

According to an embodiment, the bicycle further includes a crank arm fixedly attached to the crank axle to facilitate the rotation of the crank axle about the central longitudinal axis of the crank axle.

In some embodiments, an angular orientation of a major axis of the elliptical sprocket relative to a longitudinal axis of the crank arm is changed in response to the sliding to the carrier shaft relative to the crank axle.

In some embodiments, the bicycle further includes an inclination sensor to determine an inclination of a terrain of travel of the bicycle, and a controller is configured to cause the movement of the lever to slide the carrier shaft relative to the crank axle based on an input from the inclination sensor to change the start time of the power stroke of the elliptical sprocket.

According to an embodiment, the controller changes the start time of the power stroke of the elliptical sprocket based on a direction of the travel of the bicycle.

In some embodiments, the bicycle further includes a keeper post to prevent a movement of the sprocket in a direction substantially parallel to the central longitudinal axis According to an embodiment, the frame is a split frame having a first tube member and a second tube member. The crank axle is supported on the first tube member and the second tube member and the carrier shaft is mounted on a portion of the crank axle arranged between the first tube member and the second tube member.

In some embodiments, the sprocket is arranged between the first tube member and the second tube member.

DETAILED DESCRIPTION

Figure 1:
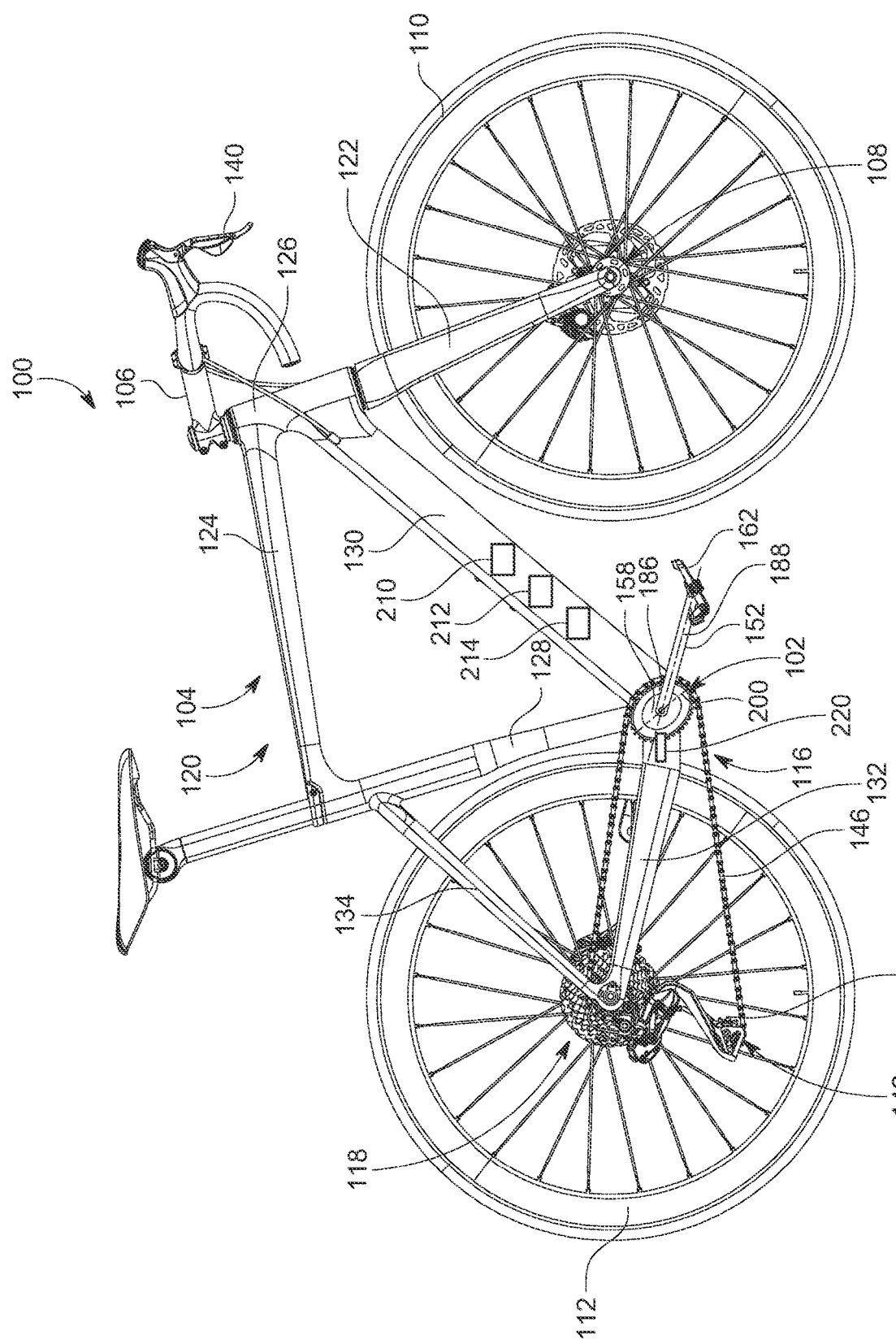
FIG. 1 illustrates a side view of an example bicycle, in accordance with an embodiment of the disclosure.

Example embodiments are described below with reference to the accompanying drawings. Unless otherwise expressly stated in the drawings, the sizes, positions, etc., of components, features, elements, etc., as well as any distances therebetween, are not necessarily to scale, and may be disproportionate and/or exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one element could be termed a "first element" and similarly, another element could be termed a "second element," or vice versa. The section headings used herein are for organizational purposes only and are not to be construed as limiting the subject matter described.

Unless indicated otherwise, the terms "about," "thereabout," "substantially," etc., mean that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "right," "left," "below," "beneath," "lower," "above," and "upper," and the like, may be used herein for ease of description to describe one element's or feature's relationship to another element or feature, as illustrated in the drawings. It should be recognized that the spatially relative terms are intended to encompass different orientations in addition to the orientation depicted in the figures. For example, if an object in the figures is turned over, elements described as "below" or "beneath" other elements or features would then be oriented "above" the other elements or features. Thus, the term "below" can, for example, encompass both an orientation of above and below. An object may be otherwise oriented (e.g., rotated 90 degrees or at other orientations) and the spatially relative descriptors used herein may be interpreted accordingly.

Unless clearly indicated otherwise, all connections and all operative connections may be direct or indirect. Similarly, unless clearly indicated otherwise, all connections and all operative connections may be rigid or non-rigid.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments.

Referring to FIG. 1, a bicycle 100 having a crank assembly 102 that allows for adjusting a timing of a power stroke of pedaling of the bicycle 100 according to an inclination of a terrain relative to the ground and a direction of travel on the inclined terrain is shown. The bicycle 100 includes a frame 104, a handlebar 106, a front hub assembly 108, a front wheel 110, a rear wheel 112, a driving portion 116 (including the crank assembly 102 and, a rear hub assembly 118).

The frame 104 includes a frame body 120 and a front fork 122. The frame body 120 includes a top tube 124, a head tube 126, a seat tube 128, a down tube 130, a pair of chain stays 132, a pair of seat stays 134, and a bottom bracket 136 (see FIG. 2). The front fork 122 is rotatably attached to the head tube 126 of the frame body 120, and the handlebar 106 is fixed to the front fork 122.

The front hub assembly 108 is supported on the front fork 122, and the front wheel 110 is rotatably attached to the front fork 122 through the front hub assembly 108. The rear wheel 112 is rotatably attached to a rear portion of the frame 104 (i.e., the frame body 120) through the rear hub assembly 118.

Further, the bicycle 100 includes a pair of brake levers 140 to be manipulated by a rider of the bicycle to apply front and rear brake devices (not shown) of the bicycle 100. Further, the bicycle 100 includes a gear change portion 142 having a derailleur 144 and attached to the frame 104 (the frame body 120). The derailleur 144 moves a bicycle chain 146 from a rear sprocket to an adjacent rear sprocket upon a shift operation of a shift lever (not shown) attached to the handlebar 106.

Figure 2:
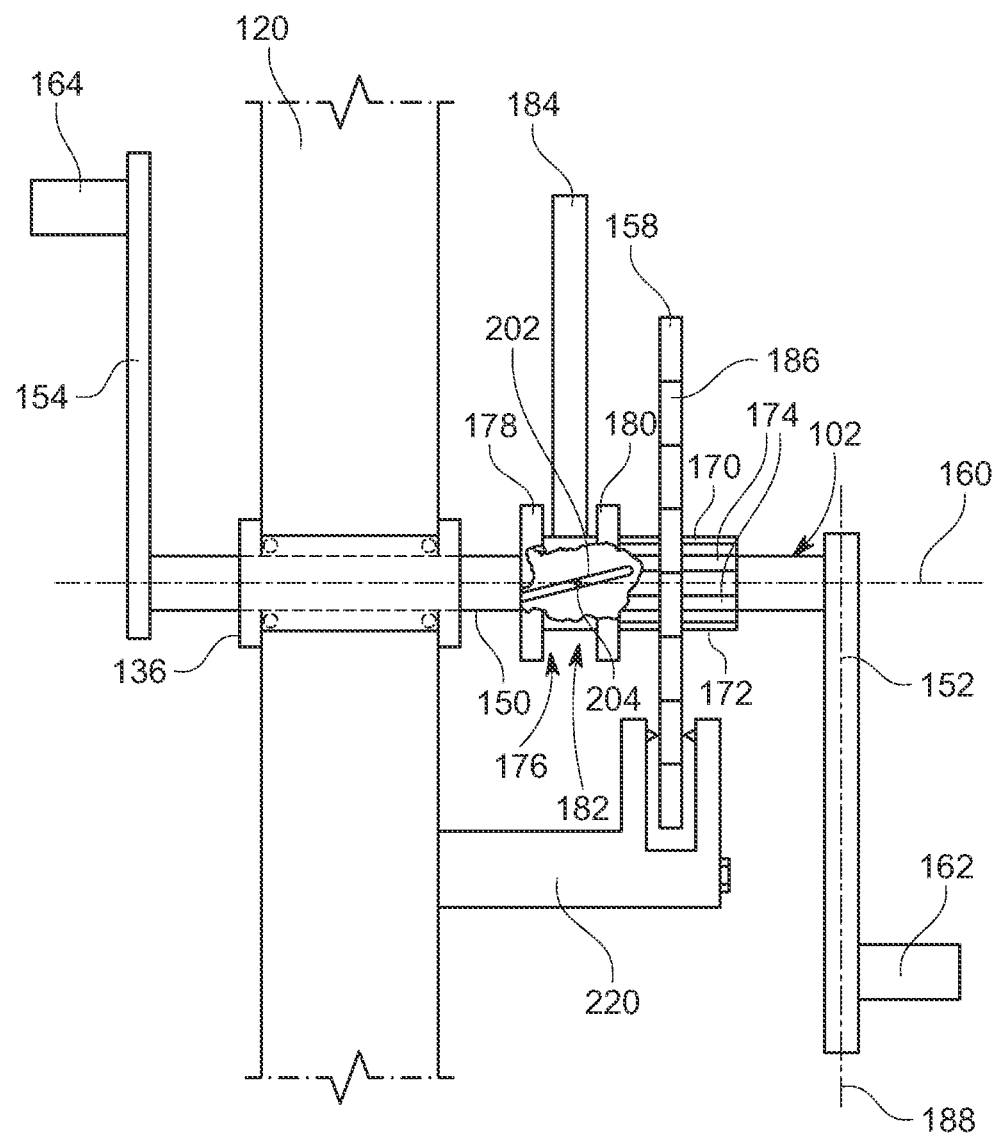
FIG. 2 illustrates a schematic view of a crank assembly of the bicycle of FIG. 1, in accordance with an embodiment of the disclosure.

The crank assembly 102 is rotatably supported on a lower portion of the frame 104, for example, by the bottom bracket 136. As best shown in FIG. 2, the crank assembly 102 includes a crank axle 150 (i.e., pedal shaft 150), a first crank arm 152 (i.e., right crank arm), a second crank arm (i.e., left crank arm 154), and a drive sprocket 158 mounted on the crank axle 150 and configured to rotate about a central longitudinal axis 160 of the crank axle 150 along with the crank axle 150 upon application of torque/force on the crank arms 152, 154.

The right crank arm 152 and the left crank arm 154 are mounted on opposite ends of the crank axle 150. For example, a crank axle mounting portions the left crank arm 154 is attached fixedly to one end of the crank axle 150, and a crank axle mounting portion of the right crank arm 152 is attached fixedly to the other end of the crank axle 150. As shown in FIGS. 1 and 2, a first pedal 162 and a second pedal 164 are attached to pedal mounting portions of the right crank arm 152 and the left crank arm 154.

Moreover, the crank assembly 102 includes a carrier shaft 170 slidably mounted to the crank axle 150 and is adapted to slide relative to the crank axle 150 in a direction substantially parallel to a central longitudinal axis 160 of the crank axle 150. The carrier shaft 170 is in the form of a hollow tube and is disposed between the right crank arm 152 and the frame body 120 and is arranged on a right side of the bicycle 100. As shown, the carrier shaft 170 includes a spline portion 172 having a plurality of splines 174 arranged at an outer surface of the carrier shaft 170 extending radially outwardly of the outer surface, and a retention structure 176 having a first flange 178 and a second flange 180 extending radially outwardly from the outer surface of the body of the carrier shaft 170 and defining a gap 182 therebetween. The spline portion 172 enables an engagement of the drive sprocket 158 to the carrier shaft 170, while the retention structure 176 facilitates an engagement of a lever 184 of the crank assembly 102 to the carrier shaft 170 to enable the sliding of the carrier shaft 170 on the crank axle 150 and relative to the crank axle 150. The lever 184 is mounted on the carrier shaft 170 at a location between the two flanges 178, 180. In an embodiment, the lever 184 is fixedly attached/mounted to the carrier shaft 170.

As shown in FIG. 1, the sprocket 158 is an elliptical sprocket 186 enabling a start of a power stroke of the bicycle 100 when the crank arm, i.e., the right crank arm 152 is arranged at a location different from a top position and a bottom position of the crank arm 152. Further, the crank assembly 102 also enables a shifting of the start timing of the power stroke of the bicycle 100 by changing a position or angular orientation of a major axis 200 of the elliptical sprocket 186 relative to a longitudinal axis 188 of the right crank arm 152.

To enable such a change in the start timing of the power stroke of the bicycle 100, the carrier shaft 170 includes a slot 202 extending in a curved manner along an inner surface of carrier shaft 170. Accordingly, instead of the slot 202 being in a straight line that is substantially parallel/aligned to the central longitudinal axis 160 of the carrier shaft 170, the slot 202 moves arcuately about the central longitudinal axis 160 along the inner surface of carrier shaft 170, and also extends linearly in the direction of the axis 160. Accordingly, a projection of the slot 202 in a horizontal plane containing the central longitudinal axis 160, when viewed from top, is inclined to and intersects with the central longitudinal axis 160. Also, the carrier shaft 170 is engaged with the crank axle 150 by inserting a radial projection of the crank axle 150 or a key 204 inside the slot 202. Accordingly, as the carrier shaft 170 is slid along the central longitudinal axis 160 by using the lever 184, the carrier shaft 170 also rotates about the central longitudinal axis 160, causing a change in the angular position of the crank arm, for example, right crank arm 152, relative to the major axis 200 of the sprocket 158, resulting into a change in the start time of the power stroke of the bicycle 100 (i.e., elliptical sprocket 186). In this manner, by sliding the carrier shaft 170 in a first direction or a second direction opposite to the first direction, the start timing of the power stroke may be advanced or delayed.

Additionally, or optionally, the bicycle 100 may include an actuator (not shown), for example, an electric motor to operate/move the lever 184 for sliding the carrier shaft 170 over the crank axle 150 to change the start timing of the power stroke of the bicycle 100. For so doing, the bicycle 100 (i.e., the crank assembly 102) may include a controller 210 operatively connected with the actuator to operate the actuator. In an embodiment, the bicycle 100 (i.e., the crank assembly 102) may include an inclination sensor 212 to determine an angle of inclination of the terrain on which the bicycle 100 is moving, and a direction sensor 214 to ascertain whether the bicycle 100 is travelling uphill or downhill. Based on the inputs received from the sensors 212, 214, the controller may actuate the actuator to operate the lever to suitable slide and position the carrier shaft 170 to adjust the start timing of the power stroke of the bicycle. In some embodiments, instead of sensors 212, 214, the rider moves the actuator to operate the lever 184 and hence slide the carrier shaft 170 over the crank axle 150 by operating a switch (not shown). In an embodiment, the rider of the bicycle may operate the switch in a first direction to advance the start timing of the power stroke, and may operate the switch in a second direction to delay the start timing of the power stroke. In some embodiments, the rider may manipulate the lever manually to adjust the start time of the power stroke of the bicycle (i.e., elliptical sprocket 186).

Figure 3:
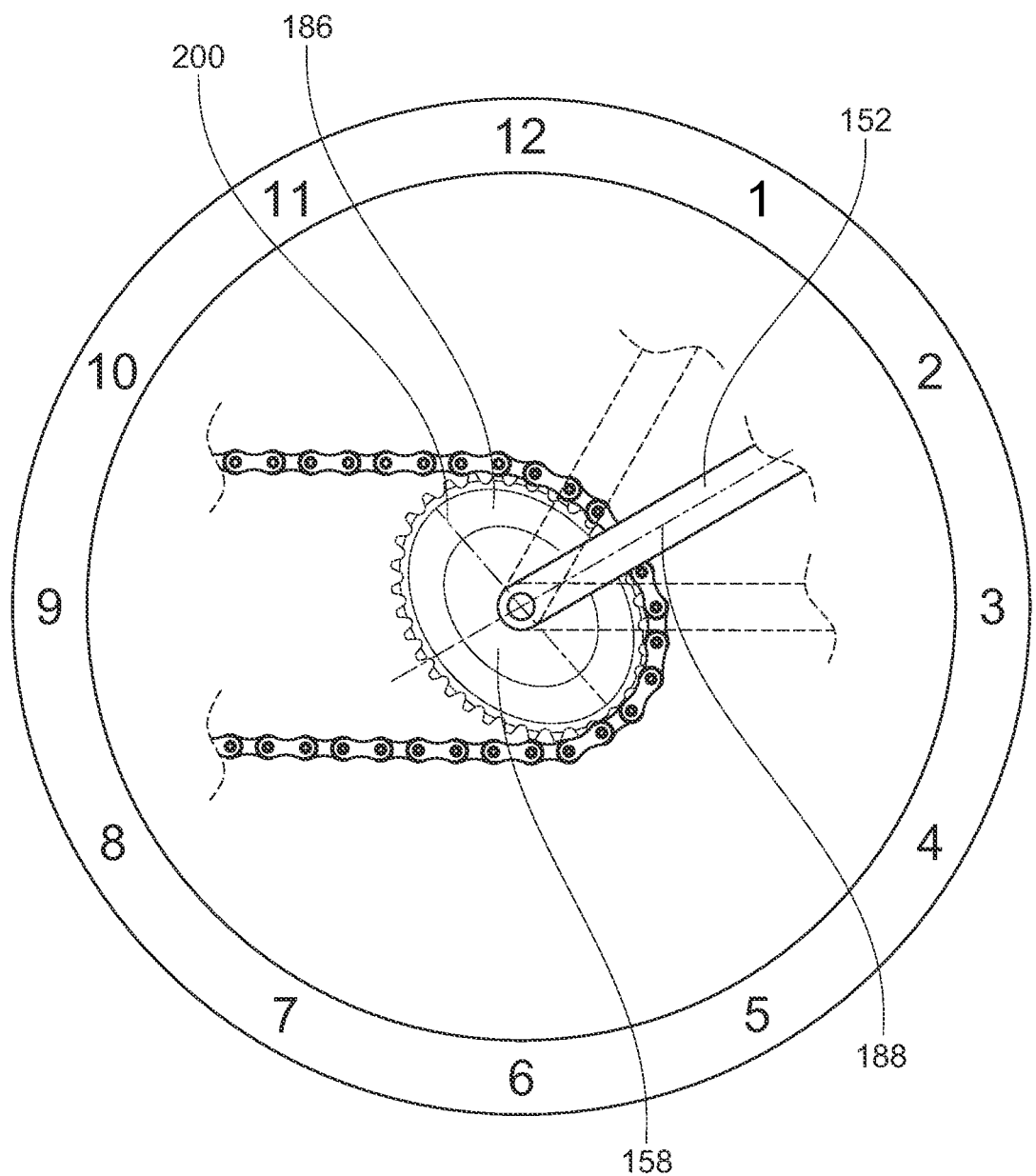
FIG. 3 illustrates depicts a timing diagram depicting timing of a power stroke of the bicycle, in accordance with an embodiment of the disclosure.

In an exemplary scenario, as shown in FIG. 3, during the movement of the bicycle 100 on a horizontal ground, the power stroke of the bicycle 100 begins when the central axis 188 of the right crank arm 152 is at 2, considering one full circle of the revolution of the right crank arm 152 as a clock face. Accordingly, the start time of the power stroke corresponds to 60 degrees angle of the right crank arm 152 from a vertical upward position. It is desirable to change the start time of the power stroke of the bicycle 100 during uphill or downhill movement of the bicycle 100 to maintain the proper power zone location relative to the force of gravity independent of the bicycle frame's 104 (i.e., frame body 120) changing attitude.

Accordingly, the controller 210 may adjust the start time of the power stroke of the bicycle 100 during the uphill movement and downhill movement depending on the inclination of the road as well as direction of travel i.e., uphill or downhill movement. For so doing, during uphill movement of the bicycle 100, the controller 210 may operate the lever 184 and slide the carrier shaft 170 relative to the crank axle 150 such that start time of the power stroke is delayed and the power stroke begins later relative to the start of the power stroke when the bicycle 100 is moving on a substantially horizontal path. Accordingly, In the illustrated example, shown in FIG. 3, the carrier shaft 170 is moved on the crank axle 150 such that the power stroke begins when the right crank arm 152 is positioned at a location corresponding to 3 on the clock face i.e., the right crank arm 152 subtends 90 degrees angle relative to the vertical upward position, while going uphill. Similarly, during a downhill movement of the bicycle 100, the controller 210 may operate the lever 184 and slide the carrier shaft 170 relative to the crank axle 150 such that start time of the power stroke is advanced and the power stroke begins earlier relative to the start of the power stroke when the bicycle 100 is moving on a substantially horizontal path. Accordingly, in the illustrated example, shown in FIG. 3, the carrier shaft 170 is moved on the crank axle 150 such that the power stroke begins when the right crank arm 152 is positioned/arranged/located at a location corresponding to 1 on the clock face i.e., the right crank arm subtends 30 degrees angle relative to the vertical upward position, while going downhill. Accordingly, the crank assembly 102 of the bicycle 100 facilitate in maintaining the proper power zone location relative to the force of gravity independent of the bicycle frame's 104 (i.e., frame body 120) changing attitude.

Further, the bicycle 100 may include a keeper post 220 (shown in FIG. 2) attached to the frame body 120 of the bicycle 100 and extending in a direction substantially parallelly to the crank axle 150. The keeper post 220 is configured to prevent the movement of the sprocket 158 in a direction substantially parallel to the central longitudinal axis 160 when the carrier shaft 170 is moved over the crank axle 150, while facilitating the rotation of the sprocket 158 about its rotation axis 160. Accordingly, a distance between the sprocket 158 and the frame body 120 remains constant in the direction of the central longitudinal axis 160 when the carrier shaft 170 is linearly moved relative to the crank axle 150. In an embodiment, the keeper post 220 may include wear rings (not shown) supporting the sprocket 158. Additionally, to manage a weight distribution on bearings supporting the crank axle 150, a diameter of the crank axle 150 may change along the central longitudinal axis 160 of the crank axle 150. In an embodiment, the diameter of the crank axle 150 decreases in a direction away from the bottom bracket 136 towards the right crank arm 152.

Figure 4:
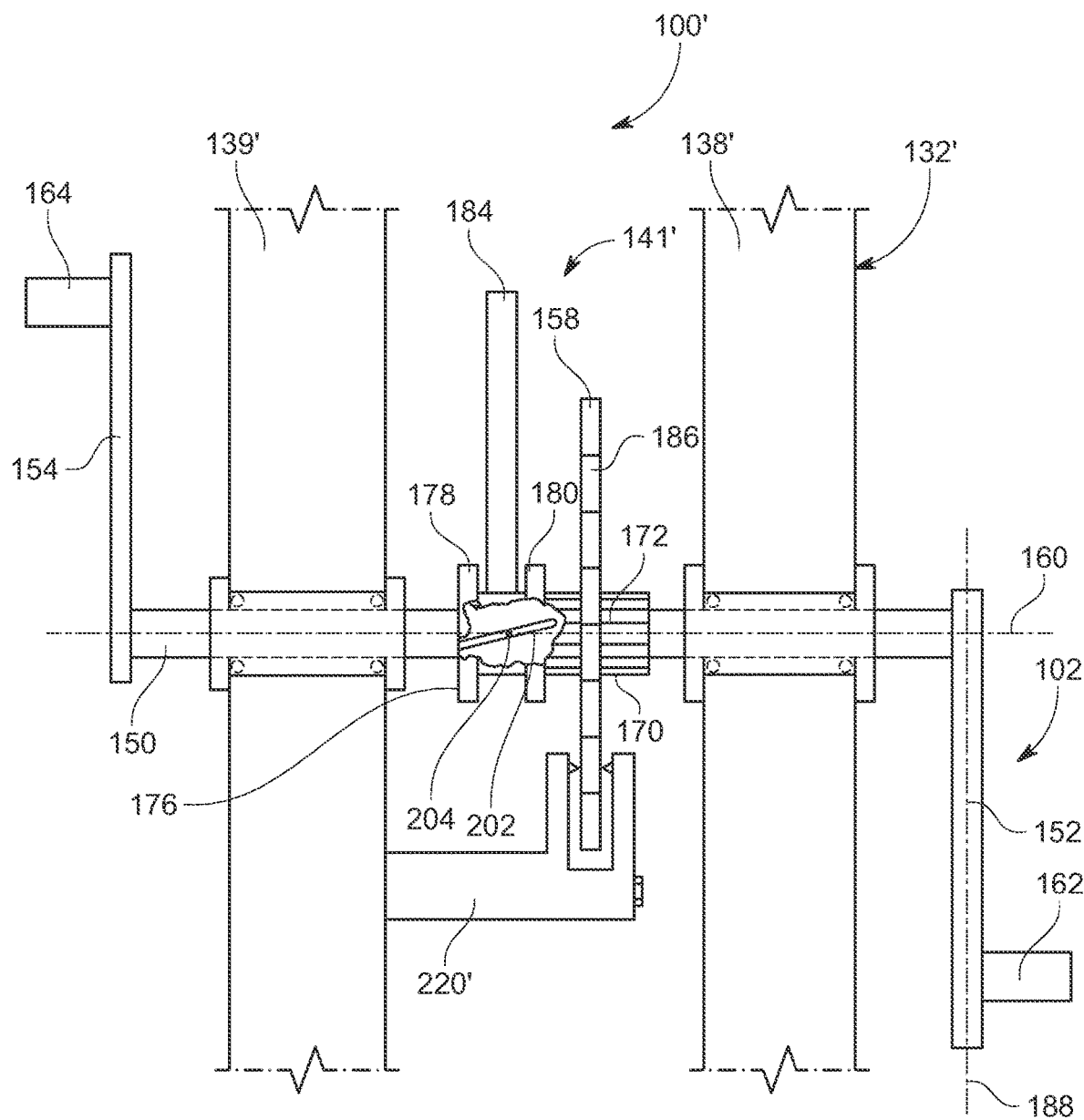
FIG. 4 illustrates a schematic view of a crank assembly of mounted a bicycle, in accordance with an alternative embodiment of the disclosure.

Referring to FIG. 4, a portion of a bicycle 100' according to alternative embodiment is shown. The bicycle 100' is similar to the bicycle 100 except that a down tube 130' is a split tube having a first tube member 138' and a second tube member 139' arranged spaced apart from each other and defining a space 141' therebetween. Accordingly, a first portion of the crank axle 150 is rotatably supported by the first tube member 138' and a second portion of the crank axle 150 is rotatably supported by the second tube member 139'. Further, the sprocket 158, the carrier shaft 170, and the lever 184 are arranged inside the space 141' and is supported on the portion of the crank axle 150 arranged inside the space. Further, a keeper post 220' extends inside the space 141' and extends from the second tube member 139' towards the first tube member 138' in a direction substantially parallel to the central longitudinal axis 160 of the crank axle 150. A structure and a function of the keeper post 220' is similar to the keeper post 220 of the bicycle 100.

Many modifications and other embodiments of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims.

What is claimed is:

1. A crank assembly for a bicycle, the crank assembly comprising:
   a crank axle rotatably mounted to a frame of the bicycle;
   a carrier shaft slidably mounted on the crank axle and configured to slide in a direction substantially parallel to a central longitudinal axis of the crank axle and relative to the crank axle; and
   an elliptical sprocket mounted on the carrier shaft, wherein the elliptical sprocket rotates to move the bicycle in response to a rotation of the crank axle,
   wherein a start time of a power stroke of the elliptical sprocket is changed by sliding the carrier shaft relative to the crank axle.

2. The crank assembly of claim 1, wherein the carrier shaft includes a curved slot defined along an inner surface of the carrier shaft, wherein the carrier shaft rotates about the central longitudinal axis in response to the sliding of the carrier shaft relative to the crank axle to facilitate in changing the start time of the power stroke of the elliptical sprocket.

3. The crank assembly of claim 1, wherein the carrier shaft includes external splines engaged with the sprocket to couple the sprocket with the carrier shaft.

4. The crank assembly of claim 1 further including a lever engaged to the carrier shaft and adapted to be manipulated to enable the sliding of the carrier shaft relative to the crank axle.

5. The crank assembly of claim 1 further including a crank arm fixedly attached to the crank axle to facilitate the rotation of the crank axle about the central longitudinal axis of the crank axle.

6. The crank assembly of claim 5, wherein an angular orientation of a major axis of the elliptical sprocket relative to a longitudinal axis of the crank arm is changed in response to the sliding to the carrier shaft relative to the crank axle.

7. The crank assembly of claim 1 further including
   an inclination sensor to determine an inclination of a terrain of travel of the bicycle, and
   a controller is configured to cause the movement of the lever to slide the carrier shaft relative to the crank axle based on an input from the inclination sensor to change the start time of the power stroke of the elliptical sprocket.

8. The crank assembly of claim 7, wherein the controller changes the start time of the power stroke of the elliptical sprocket based on a direction of the travel of the bicycle.

9. The crank assembly of claim 1 further including a keeper post to prevent a movement of the sprocket in a direction substantially parallel to the central longitudinal axis.

10. A bicycle, comprising:
    a frame;
    a front wheel and a rear wheel supported on the frame;
    a crank axle rotatably mounted to the frame;
    a carrier shaft slidably mounted on the crank axle and configured to slide in a direction substantially parallel to a central longitudinal axis of the crank axle and relative to the crank axle; and
    an elliptical sprocket mounted on the carrier shaft, wherein the elliptical sprocket rotates to rotate the rear wheel in response to a rotation of the crank axle,
    wherein a start time of a power stroke of the elliptical sprocket is changed by sliding the carrier shaft relative to the crank axle.

11. The bicycle of claim 10, wherein the carrier shaft includes a curved slot defined along an inner surface of the carrier shaft, wherein the carrier shaft rotates about the central longitudinal axis in response to the sliding of the carrier shaft relative to the crank axle to facilitate in changing the start time of the power stroke of the elliptical sprocket.

12. The bicycle of claim 11, wherein the carrier shaft includes external splines engaged with the sprocket to securely mount the sprocket on the carrier shaft.

13. The bicycle of claim 11 further including a lever engaged to the carrier shaft and adapted to be manipulated to slide of the carrier shaft relative to the crank axle.

14. The bicycle of claim 11 further including a crank arm fixedly attached to the crank axle to facilitate a rotation of the crank axle about the central longitudinal axis of the crank axle.

15. The bicycle of claim 14, wherein an angular orientation of a major axis of the elliptical sprocket relative to a longitudinal axis of the crank arm is changed in response to the sliding to the carrier shaft relative to the crank axle.

16. The bicycle of claim 11 further including
   an inclination sensor to determine an inclination of a terrain of travel of the bicycle, and
   a controller is configured to cause the movement of the lever to slide the carrier shaft relative to the crank axle based on an input from the inclination sensor to change the start time of the power stroke of the elliptical sprocket.

17. The bicycle of claim 16, wherein the controller changes the start time of the power stroke of the elliptical sprocket based on a direction of the travel of the bicycle.

18. The bicycle of claim 11 further including a keeper post to prevent a movement of the sprocket in a direction substantially parallel to the central longitudinal axis.

19. The bicycle of claim 11, wherein the frame is a split frame having a first tube member and a second tube member, wherein the crank axle is supported on the first tube member and the second tube member and the carrier shaft is mounted on a portion of the crank axle arranged between the first tube member and the second tube member.

20. The bicycle of claim 19, wherein the sprocket is arranged between the first tube member and the second tube member.

\* \* \* \* \*